(12) United States Patent
Hashimoto et al.

(10) Patent No.: US 7,994,255 B2
(45) Date of Patent: Aug. 9, 2011

(54) POLYORGANIOSILOXANE-CONTAINING GRAFT COPOLYMER, RESIN COMPOSITIONS CONTAINING THE SAME AND PROCESS FOR PRODUCITON OF POLYORGANOSILOXANE EMULSIONS

(75) Inventors: Tomomichi Hashimoto, Osaka (JP); Akira Takaki, Hyogo (JP); Kazunori Saegusa, Hyogo (JP); Takao Manabe, Shiga (JP); Takao Michinobu, Osaka (JP)

(73) Assignee: Kaneka Corporation, Osaka (JP)

( * ) Notice: Subject to any disclaimer, the term of this patent is extended or adjusted under 35 U.S.C. 154(b) by 968 days.

(21) Appl. No.: 10/551,944

(22) PCT Filed: Apr. 9, 2004

(86) PCT No.: PCT/JP2004/005111
§ 371 (c)(1),
(2), (4) Date: Oct. 10, 2006

(87) PCT Pub. No.: WO2004/092236
PCT Pub. Date: Oct. 28, 2004

(65) Prior Publication Data
US 2007/0112157 A1   May 17, 2007

(30) Foreign Application Priority Data

| Apr. 11, 2003 | (JP) | 2003-107821 |
| Apr. 14, 2003 | (JP) | 2003-108733 |
| May 6, 2003 | (JP) | 2003-127954 |
| May 6, 2003 | (JP) | 2003-127955 |

(51) Int. Cl.
*C08F 283/12* (2006.01)

(52) U.S. Cl. ...................... 525/105; 525/464
(58) Field of Classification Search .................. 525/105, 525/464
See application file for complete search history.

(56) References Cited

U.S. PATENT DOCUMENTS

| 4,939,206 A * | 7/1990 | Wang | 525/63 |
| 5,188,899 A * | 2/1993 | Matsumoto et al. | 428/405 |
| 5,219,932 A | 6/1993 | Yamamoto et al. | |
| 5,457,167 A * | 10/1995 | Higaki et al. | 525/479 |
| 5,585,436 A * | 12/1996 | Niessner et al. | 525/105 |
| 5,804,655 A * | 9/1998 | Miyatake et al. | 525/69 |
| 6,153,694 A * | 11/2000 | Miyatake et al. | 525/63 |
| 7,153,899 B2 * | 12/2006 | Reddy et al. | 524/268 |
| 7,615,594 B2 * | 11/2009 | Hashimoto et al. | 525/105 |
| 2002/0002063 A1 | 1/2002 | Miyamoto et al. | |
| 2005/0038149 A1 | 2/2005 | Hashimoto et al. | |

FOREIGN PATENT DOCUMENTS

| EP | 0 367 219 A2 | 5/1990 |
| EP | 0 457 616 A2 | 11/1991 |
| EP | 0 486 853 A1 | 5/1992 |
| EP | 1 174 466 A1 | 1/2002 |
| EP | 1 338 625 A1 | 8/2003 |
| EP | 1 475 396 A1 | 11/2004 |
| EP | 1 500 682 A1 | 1/2005 |
| EP | 1 505 123 A1 | 2/2005 |
| JP | 61-106614 A | 5/1986 |
| JP | 61-235462 A | 10/1986 |
| JP | 5-25228 A | 2/1993 |
| JP | 7-33836 A | 2/1995 |
| JP | 7-206951 A | 8/1995 |
| JP | 8-3253 A | 1/1996 |
| JP | 8-12846 A | 1/1996 |
| JP | 10-310616 A | 11/1998 |
| JP | 10-316724 A | 12/1998 |
| JP | 2000-17029 A | 1/2000 |
| JP | 2000-226420 A | 8/2000 |
| JP | 2000-264968 A | 9/2000 |
| JP | 2002-26807 A | 1/2002 |
| JP | 2002-201243 A | 7/2002 |
| JP | 2003-20437 A | 1/2003 |
| JP | 2003-89749 A | 3/2003 |
| JP | 2003-96142 A | 4/2003 |
| JP | 2003-238639 A | 8/2003 |
| JP | 2003-327635 A | 11/2003 |

OTHER PUBLICATIONS

International Search Report from corresponding International Application No. PCT/JP2004/005111, dated Jul. 13, 2004, 8 pages.

* cited by examiner

*Primary Examiner* — Margaret G Moore
(74) *Attorney, Agent, or Firm* — Sughrue Mion, PLLC

(57) ABSTRACT

The present invention relates to a flame retardant which is a graft copolymer. The graft copolymer is obtained by polymerizing a vinyl monomer containing at least two polymerizable groups, and at least one other vinyl monomer, in the presence of polyorganosiloxane particles in a latex state. The polyorganosiloxane particles contain grafting agents that are unevenly distributed on the surface thereof. The present invention also relates to thermoplastic resins containing this flame retardant.

13 Claims, No Drawings

US 7,994,255 B2

POLYORGANIOSILOXANE-CONTAINING GRAFT COPOLYMER, RESIN COMPOSITIONS CONTAINING THE SAME AND PROCESS FOR PRODUCITON OF POLYORGANOSILOXANE EMULSIONS

RELATED APPLICATIONS

This application is a nationalization of PCT application PCT/JP2004/005111 filed on Apr. 9, 2004, claiming priority based on Japanese Application No. 2003-107821 filed on Apr. 11, 2003, Japanese Application No. 2003-108733 filed on Apr. 14, 2003, Japanese Application No. 2003-127954 filed on May 6, 2003, Japanese Application No. 2003-127955 filed on May 6, 2003, the contents of which are incorporated herein by reference in their entirety.

TECHNICAL FIELD

The present invention relates to a flame-retardant resin composition. More specifically, the present invention relates to a graft copolymer containing polyorganosiloxane and a resin composition containing the same, which is excellent in flame retardancy and impact resistance. Also, the present invention relates to a process for preparing an emulsion of polyorganosiloxane.

BACKGROUND ART

Polycarbonate resin is widely used for electric and electronic parts, OA instruments, household products and building material, due to excellent impact resistance, heat resistance and electric properties. Polycarbonate resin has higher flame retardancy than polystyrene resin. Some fields, particularly the fields of electric and electronic parts and OA instruments, require high flame retardancy and improvement thereof is attempted, by adding various flame retardants. For example, conventionally, organic halogen compounds or organic phosphorous compounds have been added. However, many organic halogen compounds and organic phosphorous compounds are problematic in terms of toxicity and particularly, organic halogen compounds have the problem of producing corrosive gas when burning. Therefore, demands for achieving flame retardancy by a non-halogen or non-phosphorous flame retardant have been increasing in recent years.

As a non-halogen or non-phosphorous flame retardant, use of a polyorganosiloxane compound (also referred to as silicone) has been suggested. Conventionally, as a method for obtaining an flame-retardant resin composition using a polyorganosilxane compound, known are the method of obtaining flame-retardant resin by kneading a silicone resin comprising monoorganopolysiloxane with a non-silicone polymer (JP-A-54-36365), the method of obtaining a flame-retardant resin composition by dispersing a silicone resin, prepared by mixing 100 parts by weight of polyorganosiloxane and 10 to 150 parts by weight of a silica filler, in a thermoplastic resin (JP-A-8-113712) and the method of obtaining a flame-retardant resin composition by adding a silicone resin, which has a weight average molecular weight of at least 10,000 to at most 270,000 and is soluble in a solvent, to a non-silicone resin containing an aromatic ring (JP-A-10-139964). However, although silicone resin is recognized to have the effect of imparting flame retardancy, the effect is insufficient. When the amount of silicone resin is increased to compensate this insufficiency, impact resistance of the resin composition becomes poor and there is the problem that obtaining a flame-retardant resin composition excellent in both flame retardancy and impact resistance is difficult.

As a method for obtaining a flame-retardant resin composition having impact resistance using a polyorganosiloxane compound, known are the method of obtaining a flame-retardant resin composition by compounding a composite rubber flame retardant, obtained by graft polymerizing a vinyl monomer to a composite rubber comprising polyorganosiloxane rubber and polyalkyl(meth)acrylate rubber, in a thermoplastic resin (JP-A-2000-17029), the method of obtaining a flame-retardant resin composition by compounding a polyorganosiloxane flame retardant, obtained by grafting a vinyl monomer to composite particles of polyorganosiloxane having an aromatic group and a vinyl monomer, in a thermoplastic resin (JP-A-2000-226420), the method of obtaining a flame-retardant resin composition by compounding a graft copolymer containing polyorganosiloxane, obtained by graft polymerizing a vinyl monomer to polyorganosiloxane particles of at most 0.2 μm, in a thermoplastic resin (JP-A-2000-264935) and the method of obtaining a flame-retardant resin composition by compounding respectively a specific amount of a graft copolymer containing polyorganosiloxane, obtained by graft polymerizing a vinyl monomer to polyorganosiloxane particles of at most 0.2 μm, and polytetrafluoroethylene in a thermoplastic resin (JP-A-2002-348453). However, although each flame-retardant resin composition has impact resistance of a satisfactory level, flame retardancy of a sufficient level cannot be obtained in a thin molded article, for which demands are increasing in the market, and significant improvement in flame retardancy is desired.

Usually, in emulsion polymerization of cyclic siloxane under the condition of an acid catalyst, polymerization conversion ratio is known to be approximately 85% and improvement in polymerization conversion ratio is desired (see for example U.S. Pat. No. 532,471 or "Silicone" published by The Nippon Kogyo Shimbun, Ltd., Feb. 2, 1974, p. 38).

Also, in recent years, pollution due to residue of siloxane of low molecular weight in polyorganosiloxane resin and influence of cyclic siloxane of low molecular weight to the environment is a problem and keeping the residue of low molecular weight siloxane as low as possible is becoming necessary.

On the other hand, as a method of emulsion polymerization of polyorganosiloxane, known is the process for preparing an emulsion of polyorganosiloxane obtained from polyorganopolysiloxane and organosilane having a condensation reactive group, which can be bonded with a silicone atom, or a partially hydrolyzed condensate thereof.

For example, known are the method of emulsion polymerizing cyclic organosiloxane and organotrialkoxysilane bonded with a functional group (JP-B-56-38609) and the method of adding alkoxysilanes having 3 to 4 functional groups as a crosslinking agent when polymerizing siloxane (JP-A-60-252613). Also, in another document (JP-A-61-106614), described is a process for preparing an emulsion of polyorganosiloxane, which comprises adding alkoxysilanes having 2 to 4 functional groups as a crosslinking agent in the presence of organopolysiloxane. More specifically, described is the process for emulsion polymerizing cyclic or linear siloxane of low molecular weight and a crosslinking agent, in the presence of 1 to 50% by weight, preferably 10 to 30% by weight, of polysiloxane as a pre-polymerized latex.

The above methods are methods for coexisting compounds having a hydrolyzable silicone functional group (alkoxysilane) excluding cyclic siloxane in emulsion polymerization. By coexisting multi-functional alkoxysilane as a component of siloxane having low molecular weight when polymerizing polysiloxane, unwanted condensation reaction among the crosslinking agent progresses when polymerizing and by-products such as scale particles are produced. As a result, there is concern that the properties may be adversely affected. Also, polymerization conversion ratio is insufficient and a method for improving polymerization conversion ratio further is desired.

DISCLOSURE OF INVENTION

The present invention relates to a graft copolymer containing polyorganosiloxane obtained by 0 to 10 parts by weight of a vinyl monomer (B) comprising 100 to 20% by weight of a multi-functional monomer containing at least two polymerizable unsaturated bonds in a molecule (b-1) and 0 to 80% by weight of another copolymerizable monomer (b-2) and 5 to 70 parts by weight of a vinyl monomer (C), in the presence of 30 to 95 parts by weight of polyorganosiloxane in a latex state (A), so that the total amount of polyorganosiloxane (A), vinyl monomer (B) and vinyl monomer (C) becomes 100 parts by weight.

Polyorganosiloxane (A) is preferably obtained by seed polymerizing organosiloxane using a seed polymer that is swelled by organosiloxane.

The particle size of the seed polymer is preferably 0.001 to 0.03 μm.

Tg (glass transition temperature) of the seed polymer is preferably at most 0° C.

The proportion of the seed polymer to polyorganosiloxane (A) is preferably 0.1 to 10% by weight.

The swelling volume ratio of the seed polymer is preferably 3 to 50 times.

The swelling volume ratio is preferably 5 to 25 times.

The vinyl monomer (C) is preferably at least one monomer selected from the group consisting of an aromatic vinyl monomer, a cyanized vinyl monomer, a (meth)acrylic ester monomer and a vinyl monomer containing a carboxyl group.

A radical polymerization initiator (D) having solubility to water of 0.5 to 10 g/100 g (20° C.) and hydrogen drawing properties of 10 to 30% is preferably used when polymerizing vinyl monomer (B) and/or vinyl monomer (C).

Polyorganosiloxane (A) is preferably modified by a grafting agent (E).

The amount of grafting agent (E) is preferably 0.1 to 10 parts by weight based on 100 parts by weight of polyorganosiloxane (A).

Polyorganosiloxane (A), which is modified by grafting agent (E), is preferably reacted with grafting agent (F) and then vinyl monomer (B) and vinyl monomer (C) are preferably polymerized.

The reaction temperature of grafting agent (F) and vinyl monomer (B) is preferably 20 to 60° C.

The present invention also relates to a flame retardant comprising the graft copolymer containing polyorganosiloxane.

The present invention also relates to a resin composition comprising 0.1 to 20 parts by weight of the flame retardant based on 100 parts by weight of thermoplastic resin.

The present invention also relates to a process for preparing an emulsion of polyorganosiloxane, which comprises obtaining polyorganosiloxane (H) by emulsion polymerizing cyclic organosiloxane under acidic conditions of pH of at most 5, and adding condensation reactive organosilane represented by formula (1):

(1)

(wherein R¹ represents an organic group, R² represents a hydrogen atom or an alkyl group having 1 to 5 carbon atoms, n represents an integer of 0 to 3) or a partially hydrolyzed condensate thereof (I) (hereinafter referred to as condensation reactive organosilane (I)).

0.1 to 50 parts by weight of condensation reactive organosilane (I) is preferably added based on 100 parts by weight of polyorganosiloxane (H) and reaction is preferably conducted at a temperature of 30 to 95° C. under acidic conditions of pH of at most 5.

The temperature of polyorganosiloxane (H) when adding condensation reactive organosilane (I) is preferably 10 to 50° C.

Polyorganosiloxane (H) is preferably obtained by polymerizing 100 parts by weight of cyclic organosiloxane and 0.01 to 20 parts by weight an alkoxysilane compound having a radical-polymerizable functional group in a molecule (J).

Polyorganosiloxane (H) is preferably obtained by emulsion polymerizing under acidic conditions and then aging at a temperature of 10 to 50° C. for at least 6 hours.

The radical-polymerizable functional group of alkoxysilane compound (J) is preferably at least one functional group selected from the group consisting of a (meth)acryloyloxy group, a mercapto group, a vinyl group and a styryl group.

The present invention also relates to a graft copolymer containing polyorganosiloxane obtained by polymerizing 5 to 70 parts by weight of a vinyl monomer based on 95 to 30 parts by weight of polyorganosiloxane particles in the emulsion of polyorganosiloxane obtained by the above process, so that the total amount becomes 100 parts by weight.

BEST MODE FOR CARRYING OUT THE INVENTION

The present invention relates to a graft copolymer containing polyorganosiloxane obtained by polymerizing 0 to 10 parts by weight of a vinyl monomer (B) comprising 100 to 20% by weight of a multi-functional monomer containing at least two polymerizable unsaturated bonds in a molecule (b-1) and 0 to 80% by weight of another copolymerizable monomer and 5 to 70 parts by weight of a vinyl monomer (C), in the presence of 30 to 95 parts by weight of polyorganosiloxane in a latex state (A), so that the total amount of polyorganosiloxane (A), vinyl monomer (B) and vinyl monomer (C) becomes 100 parts by weight.

Polyorganosiloxane (A) used in the present invention can be obtained by normal emulsion polymerization, but is preferably obtained by seed polymerizing organosiloxane using a seed polymer that is swelled by organosiloxane, from the viewpoint of advantages such as particle size distribution in latex can be made narrow and flame retardancy is favorable. Also, as polyorganosiloxane (A), a substance obtained by obtaining polyorganosiloxane (H) by emulsion polymerizing cyclic organosiloxane under acidic conditions of pH of at most 5 and then adding condensation reactive organosilane represented by formula (1):

(1)

(wherein R¹ represents an organic group, R² represents a hydrogen atom or an alkyl group having 1 to 5 carbon atoms, n represents an integer of 0 to 3) is preferably used, as described later, from the viewpoints of being easily obtainable and cost.

The seed polymer can be any seed polymer that swells when organosiloxane is added and does not need to be hydrophilic. The seed polymer can be obtained by normal emulsion polymerization and the synthesizing process is not particularly limited. Examples of the seed polymer that is swelled by organosiloxane are not limited to rubber components such as butyl acrylate rubber, butadiene rubber, butadiene-styrene rubber and butadiene-acrylonitrile rubber and polymers such as a copolymer of butyl acrylate and styrene and a copolymer of styrene and acrylonitrile can be used. Also, a chain transfer agent is not used for polymerization of the seed polymer and so the seed polymer does not have water solubility.

To improve swellability of the seed polymer to organosiloxane, the method of lowering Tg of the seed polymer and the method of decreasing the particle size of the seed polymer are effective. Particularly, the latter is extremely effective. Tg of the seed polymer is preferably at most 0° C., more preferably at most –20° C. The particle size of the seed polymer in a latex state is preferably 0.001 to 0.03 μm, more preferably 0.005 to 0.01 μm. When the particle size is within the above range, the seed polymer can easily be synthesized with stability and has favorable swellability. Also, flame retardancy of the final molded article is improved.

Swellability of the seed polymer is preferably 3 to 50 times, more preferably 5 to 25 times, in swelling volume ratio. When the swelling volume ratio is less than 3 times, the effect of improving flame retardancy of the final molded article is small and when the swelling volume ratio is more than 50 times, synthesizing the seed polymer is difficult.

Herein, the swelling volume ratio is the value found from the ratio of particle size of the seed polymer in latex before swelling with organosiloxane and the latex particle size, after adding organosiloxane in an amount of 50 times (by weight) the solid content of the seed polymer to latex of the seed polymer and then stirring for 1 hour at 23° C. The swelling volume ratio is found from the following equation:

Swelling volume ratio=(particle size after swelling/
particle size before swelling)$^3$–1

The seed polymer is preferably used in an amount of 0.1 to 10% by weight, more preferably 0.5 to 3% by weight based on polyorganosiloxane (A). When the amount of the seed polymer is less than 0.1% by weight, the polymerization time becomes extremely long and the particle size of the obtained polyorganosiloxane (A) becomes too large that flame retardancy and impact resistance of the final molded article tends to decrease. When the amount of the seed polymer is more than 10% by weight, flammable components other than polyorganosiloxane increase in the particles of polyorganosiloxane (A) and as a result, flame retardancy of the final molded article tends to decrease.

Organosiloxane used for polymerization of polyorganosiloxane (A) has a structure unit represented by the formula:

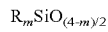

(wherein R represents a substituent or non-substituent monovalent hydrocarbon group, m represents an integer of 0 to 3) and has a linear, branched or cyclic structure. Preferably, the organosiloxane has a cyclic structure. Examples of the substituent or non-substituent monovalent hydrocarbon group of the organosiloxane are a methyl group, an ethyl group, a propyl group, a phenyl group and a substituent hydrocarbon group wherein the hydrogen atom of the above are substituted with a cyano group.

Examples of the organosiloxane are cyclic compounds such as hexamethylcyclotrisiloxane (D3), octamethylcyclotetrasiloxane (D4), decamethylcyclopentasiloxane (D5), dodecamethylcyclohexasiloxane (D6) and trimethyltriphenylcyclotrisiloxane and linear or branched organosiloxane. These organosiloxane can be used alone or two or more kinds can be used together.

In polymerization of polyorganosiloxane (A) used in the present invention, grafting agent (E) can be used. Modifying polyorganosiloxane (A) by grafting agent (E) is preferable from the viewpoint of efficiently graft polymerizing vinyl monomer (B) and vinyl monomer (C).

Examples of grafting agent (E) that can be used in the present invention are p-vinylphenylmethyldimethoxysilane, p-vinylphenylethyldimethoxysilane, 2-(p-vinylphenyl)ethylmethyldimethoxysilane, 3-(p-vinylbenzoyloxy)propylmethyldimethoxysilane, vinylmethyldimethoxysilane, tetravinyltetramethylcyclosiloxane, allylmethyldimethoxysilane, γ-mercaptopropylmethyldimethoxysilane, γ-methacryloxypropylmethyldimethoxysilane. At least one of these can be selected accordingly and used.

The proportion of grafting agent (E) that is used is preferably 0.1 to 10% by weight, more preferably 1 to 8% by weight, further preferably 2 to 6% by weight based on organosiloxane. When the amount of grafting agent (E) is too large, flame retardancy and impact resistance of the final molded article tend to decrease. When the amount of grafting agent (E) is too small, moldability of the final molded article tends to decrease.

When synthesizing polyorganosiloxane (A) used in the present invention, a crosslinking agent can be used when necessary. Examples of the crosslinking agent are trifunctional crosslinking agents such as methyltrimethoxysilane, phenyltrimethoxysilane and ethyltriethoxysilane and tetrafunctional crosslinking agents such as tetraethoxysilane, 1,3-bis[2-(dimethoxymethylsilyl)ethyl]benzene, 1,4-bis[2-(dimethoxymethylsilyl)ethyl]benzene, 1,3-bis[1-(dimethoxymethylsilyl)ethyl]benzene, 1,4-bis[1-(dimethoxymethylsilyl)ethyl]benzene, 1-[1-(dimethoxymethylsilyl)ethyl]-3-[2-(dimethoxymethylsilyl)ethyl]benzene and 1-[1-(dimethoxymethylsilyl)ethyl]-4-[2-(dimethoxymethylsilyl)ethyl]benzene. These crosslinking agents can be used alone or two or more kinds can be mixed and used. The amount of the crosslinking agent that is added is preferably at most 10% by weight, more preferably at most 3.0% by weight based on polyorganosiloxane (A). When the amount is more than 10% by weight, flexibility of polyorganosiloxane (A) is lost and impact resistance of the final molded article tends to decrease.

The average particle size of polyorganosiloxane (A) is preferably 0.008 to 0.6 μm, more preferably 0.1 to 0.3 μm. Obtaining polyorganosiloxane having average particle size of less than 0.008 μm with stability may be difficult and when the average particle size is more than 0.6 μm, flame retardancy and impact resistance of the final molded article tend to become poor.

Vinyl monomer (B) used in the present invention is a component used for improving flame retardancy and impact resistance and comprises 100 to 20%, preferably 100 to 50%, more preferably 100 to 80% of a multi-functional monomer containing at least two polymerizable unsaturated bonds in a molecule (b-1) and 0 to 80%, preferably 0 to 50%, more preferably 0 to 20% of another copolymerizable monomer (b-2).

When the amount of the multi-functional monomer (b-1) is too small or the amount of the copolymerizable monomer (b-2) is too large, in both cases, the effect of improving impact resistance of the graft copolymer that is ultimately obtained tends to become low.

Examples of the multi-functional monomer (b-1) are allyl methacrylate, ethylene glycol dimethacrylate, 1,3-butyleneglycol dimethacrylate and divinylbenzene. These may be used alone or two or more kinds can be used together.

Examples of the other copolymerizable monomer (b-2) are aromatic vinyl monomers such as styrene and α-methylstyrene; cyanized vinyl monomers such as acrylonitrile and (meth)acrylic ester monomers such as methyl acrylate, ethyl acrylate, butyl acrylate, methyl methacrylate, ethyl methacrylate and butyl methacrylate. These may be used alone or two or more kinds can be used together.

Vinyl monomer (C) used in the present invention is a component used for acquiring solubility between the graft copolymer and thermoplastic resin, to homogeneously disperse the graft copolymer in thermoplastic resin. Vinyl monomer (C) is not particularly limited, but specific examples are aromatic vinyl monomers such as styrene and α-methylstyrene; cyanized vinyl monomers such as acrylonitrile, (meth)acrylic ester monomers such as methyl acrylate, ethyl acrylate, butyl acrylate, methyl methacrylate, ethyl methacrylate and butyl methacrylate and vinyl monomers containing a carboxyl group such as itaconic acid, (meth)acrylic acid, fumaric acid and maleic acid. These may be used alone or two or more kinds can be used together. Particularly, vinyl monomer (C) is preferably at least one monomer selected from the group consisting of an aromatic vinyl monomer, a cyanized vinyl monomer, a (meth)acrylic ester monomer and a vinyl monomer containing a carboxyl group, from the viewpoints of being easily available and cost.

The present invention is preferably obtained by polymerizing 0 to 10 parts by weight, preferably 1 to 8 parts by weight, of vinyl monomer (B) and 5 to 70 parts by weight, preferably 10 to 50 parts by weight, of vinyl monomer (C), in the presence of 30 to 95 parts by weight, preferably 50 to 90 parts by weight, of polyorganosiloxane (A), so that the total amount of polyorganosiloxane (A), vinyl monomer (B) and vinyl monomer (C) becomes 100 parts by weight.

When the amount of polyorganosiloxane (A) is less than 30 parts by weight, sufficient flame retardancy and impact resistance cannot be obtained in the final molded article and when the amount is more than 95 parts by weight, flame retardancy, impact resistance, and appearance of the final molded article become poor. When the amount of vinyl monomer (B) is more than 10 parts by weight, impact resistance of the final molded articles decreases. When the amount of vinyl monomer (C) is less than 5 parts by weight, appearance, flame retardancy and impact resistance of the final molded article decrease and when the amount is more than 70 parts by weight, flame retardancy and impact resistance of the final molded article decrease.

Also, the graft copolymer containing polyorganosiloxane is preferably obtained by reacting 30 to 94.9 parts by weight of polyorganosiloxane (A) modified by grafting agent (E) with 0.1 to 10 parts by weight of grafting agent (F) and then polymerizing 5 to 70 parts by weight of vinyl monomer (C), so that the amount of polyorganosiloxane (A), grafting agent (F) and vinyl monomer (C) becomes 100 parts by weight in total. In a more preferable embodiment, 30 to 94.9 parts by weight of polyorganosiloxane (A) modified by grafting agent (E) is reacted with 0.1 to 10 parts by weight of grafting agent (F), 0 to 10 parts by weight of vinyl monomer (B) comprising 100 to 20% by weight of a multi-functional monomer containing at least two polymerizable unsaturated bonds in a molecule (b-1) and 0 to 80% by weight of another copolymerizable monomer (b-2) is reacted at least one step and then 5 to 70 parts by weight of vinyl monomer (C) is polymerized. In a further preferable embodiment, neutralization is conducted after vinyl monomer (B) is reacted. In an even more preferable embodiment, after neutralization, 0 to 10 parts by weight of vinyl monomer (G) comprising 100 to 20% by weight of a multi-functional monomer containing at least two polymerizable unsaturated bonds in a molecule (g-1) and 0 to 80% by weight of another copolymerizable monomer (g-2) is reacted at least one step and then 5 to 70 parts by weight of vinyl monomer (C) is polymerized.

As grafting agent (F), the same grafting agents as those used for grafting agent (E) can be used.

Grafting agent (E) is copolymerized with organosiloxane, a difunctional silane compound or a silane compound having at least 3 functional groups and is a component for introducing a vinyl polymerizable group in a side chain or a terminal of the copolymer. The vinyl polymerizable group functions as a graft activity point when chemically bonding with a vinyl (co)polymer comprising vinyl monomer (B) and/or vinyl monomer (C) and/or vinyl monomer (G). Furthermore, the activity points can be radically reacting by a radical polymerization initiator to form crosslinked bonds and grafting agent (E) is a component that can be used as a crosslinking agent. Therefore, the total amount of grafting agent (E) and grafting agent (F) that is used is preferably 0.1 to 10% by weight, more preferably 0.5 to 5% by weight based on organosiloxane particles. When the total amount of grafting agent (E) and grafting agent (F) is more than 10% by weight, crosslinked bonds are excessively formed and flame retardancy and impact resistance of the final molded article may decrease. On the other hand, when the total amount of grafting agent (E) and grafting agent (F) is less than 0.1% by weight, graft activity points decrease and flame retardancy and moldability of the final molded article may decrease.

Conventionally, all of the grafting agent was mixed when polymerizing polyorganosiloxane. By dividing and adding part (grafting agent (E)) of the grafting agent and then, after the polymerization conversion ratio of polyorganosiloxane reaches equilibrium, adding and reacting the remaining part (grafting agent (F)) of the grafting agent to the latex under conditions in which ring-opening polymerization of polyorganosiloxane has difficulty progressing, the final molded article exhibits high flame retardancy while maintaining high impact resistance.

The reason for this is speculated to be that by adding grafting agent (F) under conditions in which ring-opening polymerization of polyorganosiloxane has difficulty progressing, the rate at which grafting agent (F) is introduced into the particles in equilibrium reaction of polyorganosiloxane decreases and as a result, particles are formed, wherein grafting agent (F) is unevenly distributed on the surface of particles. Consequently, by gathering the grafting agent of the center layer, which conventionally did not function as graft activity points due to being evenly located inside the polyorganosiloxane particles, to the particle surface, effectively utilizing the function of graft activity points in comparison to the conventional particle is presumed to have been successful. Therefore, the number of effective graft activity points increase while maintaining the total amount of the grafting agent that is used and in the final molded article, flame retardancy is improved while maintaining impact resistance.

The amount of grafting agent (E) when reacting polyorganosiloxane (A) modified by grafting agent (E) with grafting agent (F) is preferably 0.1 to 10 parts by weight, more preferably 1 to 4 parts by weight, in order to obtain 100 parts by weight of modified polyorganosiloxane (A). When the amount of grafting agent (E) is less than 0.1 part by weight, flame retardancy and appearance of the final molded article tend to decrease and when the amount is more than 10 parts by weight, impact resistance tends to decrease.

Modified polyorganosiloxane (A) is obtained by emulsifying organosiloxane and grafting agent (E) in water in the presence of an emulsifier by mechanical shearing and then reacting by acidifying the emulsion.

When grafting agent (F) is directly added to acidic polyorganosiloxane (A), grafting agent (F) reacts with each other before reacting with polyorganosiloxane particles to produce foreign matter, which causes decrease in flame retardancy and impact resistance. Therefore, grafting agent (F) is preferably emulsified in deionized water containing a small amount of an emulsifier in advance and then used.

Also, equilibrium reaction of polyorganosiloxane (A) in an acidic state changes according to the temperature and the reaction temperature of grafting agent (F) and vinyl monomer (B) is preferably 20 to 60° C., more preferably 30 to 50° C. When the temperature is lower than 20° C., radical polymerization of vinyl monomer (B) does not progress and unreacted monomers increase. When the temperature is higher than 60° C., equilibrium reaction of polyorganosiloxane (A) progresses excessively, effective graft activity points decrease and the effect of improving flame retardancy may not be sufficiently obtained.

When the latex is left for a long period of time in an acidic state, the grafting agent on the particle surface is decreased due to equilibrium reaction. Therefore, immediately after the reaction is finished, neutralization is preferably conducted by adding an alkali aqueous solution of sodium hydroxide, potassium hydroxide and sodium carbonate.

Also, by polymerizing vinyl monomer (C) after reaction of grafting agent (F) and neutralization, the polymerization ratio of polyorganosiloxane (A) can be improved.

When the grafting agent is used divided into grafting agent (E) and grafting agent (F), the amount of the multi-functional monomer containing at least two polymerizable unsaturated bonds in a molecule (b-1) that constitutes vinyl monomer (B) and the multi-functional monomer containing at least two polymerizable unsaturated bonds in a molecule (g-1) that constitutes vinyl monomer (G) is preferably 100 to 20% by weight, more preferably 100 to 50% by weight, particularly preferably 100 to 80% by weight. Also, the amount of another copolymerizable monomer (b-2) that constitutes vinyl monomer (B) and another copolymerizable monomer (g-2) that constitutes vinyl monomer (G) is preferably 0 to 80% by weight, more preferably 0 to 50% by weight, particularly preferably 0 to 20% by weight. When the amount of multi-functional monomer (b-1) and multifunctional monomer (g-1) is too small or when the amount of another copolymerizable monomer (b-2) and another copolymerizable monomer (g-2) is too large, in any case, the effect of improving flame retardancy and impact resistance of the ultimately obtained graft copolymer tends to become low.

As multi-functional monomer (g-1) that constitutes vinyl monomer (G), the same monomers as those used for multi-functional monomer (b-1) can be used and as another copolymerizable monomer (g-2) the same monomers as those used for another copolymerizable monomer (b-2) can be used.

With respect to the total amount of vinyl monomer (B) and vinyl monomer (G) that is used based on 100 parts by weight of the polyorganosiloxane particles in polyorganosiloxane (A), the lower limit is preferably at least 1 part by weight and the upper limit is preferably less than 10 parts by weight, more preferably less than 8 parts by weight. When the total amount of vinyl monomer (B) and vinyl monomer (G) is less than 1 part by weight or when the total amount of vinyl monomer (B) and vinyl monomer (G) is more than 10 parts by weight, in both cases, the effect of improving flame retardancy and impact resistance of the ultimately obtained graft copolymer tends to become low. The amount of vinyl monomer (G) when added separately is preferably 1 to 10 parts by weight, more preferably 1 to 3 parts by weight. When the amount is within this range, polymerization ratio of polyorganosiloxane (A) is improved and also, flame retardancy improves, thus being favorable.

When vinyl monomer (B), vinyl monomer (C) and vinyl monomer (G) are used for polymerization, emulsion polymerization can be employed and radical polymerization can be conducted in latex of polyorganosiloxane (A) modified by the grafting agent.

Examples of the radical polymerization initiator used when polymerizing vinyl monomer (B), vinyl monomer (C) and vinyl monomer (G) are organic peroxides such as cumene hydroperoxide, t-butyl hydroperoxide, benzoyl peroxide, t-butylperoxyisopropylcarbonate, di-t-butyl peroxide, t-butylperoxylaurate, p-menthane hydroperoxide, t-hexyl hydroperoxide, lauroyl peroxide, succinic acid peroxide, cyclohexanenone peroxide and acetylacetone peroxide; inorganic peroxides such as potassium persulfate and ammonium persulfate; and azo compounds such as 2,2'-azobisisobutyronitrile and 2,2'-azobis-2,4-dimethylvaleronitrile. Of these, in view of high reactivity, organic peroxides and inorganic peroxides are preferable.

Also, examples of a reducing agent used in a redox system are mixtures of ferrous sulfate/glucose/sodium pyrophosphate, ferrous sulfate/dextrose/sodium pyrophosphate and ferrous sulfate/sodium formaldehyde sulfoxylate/ethylenediamineacetate.

Particularly, a radical polymerization initiator (D) having solubility to water of 0.5 to 10 g/100 g (20° C.), more preferably 0.5 to 5 g/100 g (20° C.), and hydrogen drawing properties of 10 to 30%, more preferably 15 to 25%, is preferable from the viewpoint of efficiently covering polyorganosiloxane (A) by vinyl monomer (C). Examples of radical polymerization (D) are t-hexyl hydroperoxide and p-menthane hydroperoxide.

When the solubility to water of the radical polymerization initiator at 20° C. is lower than 0.5 g/100 g, graft efficiency (=(weight of graft polymer)/(weight of graft monomer)) of the graft copolymer containing polyorganosiloxane becomes high, but graft polymerization occurs inside the polyorganosiloxane particles and the ratio of graft polymerization at the particle surface is presumed to become relatively low. As a result, flame retardancy of the final molded article tends to decrease. When the solubility to water at 20° C. is higher than 10 g/100 g, polymerization of the graft monomer occurs in the water phase and as a result, graft efficiency decreases and flame retardancy of the final molded articles decreases.

The hydrogen drawing properties of radical polymerization initiator (D) is measured by the MSD trapping method (Makrol. Chem., 155, 239 (1972)). When the hydrogen drawing properties are lower than 10%, conversion ratio of graft polymerization has difficulty increasing and flame retardancy of the final molded articles decreases. When the hydrogen drawing properties are more than 30%, the polymerization rate decreases during graft polymerization and flame retardancy of the final molded articles decreases.

When polymerization using radical polymerization initiator (D) is conducted in a redox system such as ferrous sulfate/sodium formaldehyde sulfoxylate/disodium ethylenediaminetetraacetate, ferrous sulfate/glucose/sodium pyrophosphate and ferrous sulfate/sodium pyrophosphate/sodium phosphate, polymerization is completed even in a low polymerization temperature.

Usually, the amount of radical polymerization initiator (D) that is used is preferably $8 \times 10^{-8}$ to $4 \times 10^{-3}$ mol, more preferably $3 \times 10^{-7}$ to $1 \times 10^{-3}$ mol, particularly preferably $5 \times 10^{-6}$ to $2 \times 10^{-4}$ mol, based on 1 mol of vinyl monomer (B), vinyl monomer (C) or vinyl monomer (G) that is used. When the amount of radical polymerization initiator (D) is less than $8 \times 10^{-8}$ mol, the reaction rate is slow and production efficiency tends to become poor. When the amount of radical polymerization initiator (D) is more than 4×10⁻³ mol, heat generation during the reaction becomes large and production tends to become difficult.

The method for separating the graft copolymer from latex of the graft copolymer containing polyorganosiloxane obtained in the above manner is not particularly limited and an example is the method of coagulating by adding a metal salt such as calcium chloride, magnesium chloride and magnesium sulfate to the latex, separating, washing with water, dehydrating and drying the latex. Also, the spray drying method can be used.

By compounding in various thermoplastic resins, the graft copolymer containing polyorganosiloxane obtained in this way provides a resin composition excellent in flame retardancy and impact resistance.

As the thermoplastic resin, polycarbonate resin containing at least 50% by weight of polycarbonate is preferable from the viewpoint that favorable flame retardancy is achieved. Preferable examples of polycarbonate resin are polycarbonate; mixed resin of polycarbonate and polyester such as mixed resin of polycarbonate and polyethylene terephthalate and mixed resin of polycarbonate and polybutylene terephthalate; mixed resin of polycarbonate and acrylonitrile/styrene copolymer; mixed resin of polycarbonate and butadiene/styrene copolymer (HIPS resin); mixed resin of polycarbonate and acrylonitrile/butadiene rubber-styrene copolymer (ABS resin); mixed resin of polycarbonate and acrylonitrile/butadiene rubber/α-methylstyrene copolymer; mixed resin of polycarbonate and styrene/butadiene rubber/acrylonitrile/N-phenylmaleimide copolymer and mixed resin of polycarbonate and acrylonitrile/acrylic rubber/styrene copolymer (AAS resin).

With respect to the amount of the graft copolymer containing polyorganosiloxane that is added based on the thermoplastic resin, from the viewpoint of flame retardancy, 0.1 to 20 parts by weight, more preferably 0.5 to 10 parts by weight, of the graft copolymer (flame retardant) is preferably compounded based on 100 parts by weight of the thermoplastic resin. When the amount is less than 0.1 part by weight, flame retardancy of the final molded article may not improve. When the amount is more than 20 parts by weight, moldability (particularly flowability) of the molded article may decrease significantly.

The flame retardant powder comprising the graft copolymer containing polyorganosiloxane, which is coagulated, thermally treated, dehydrated and dried from the latex, and the thermoplastic resin can be mixed using a henschel mixer or a ribbon blender and then melting and kneading using a roll, an extruder or a kneader.

At this time, a compounding agent that is usually used can be compounded, that is an antioxidant, an anti-dropping agent, a polymer processing aid, a flame retardant, an impact modifier, a plasticizer, a lubricant, an ultraviolet ray absorbing agent, a pigment, glass fiber, a filler and a polymer lubricant.

As the method for molding the flame retardant resin composition, a molding method that is usually used for molding thermoplastic resin can be applied, that is injection molding, extrusion molding, blow molding and calender molding.

Applications of the molded article obtained from the flame retardant resin composition of the present invention are not particularly limited. Examples are applications which require flame retardancy such as a desktop computer, a laptop computer, a tower computer, a server computer, a printer and a copying machine. The obtained molded article is excellent in flame retardancy and impact resistance.

The present invention also relates to a process for preparing an emulsion of polyorganosiloxane, which comprises obtaining polyorganosiloxane (H) by emulsion polymerizing cyclic organosiloxane under acidic conditions of pH of at most 5 and then adding condensation reactive organosilane represented by formula (1):

(wherein $R^1$ represents an organic group, $R^2$ represents a hydrogen atom or an alkyl group having 1 to 5 carbon atoms, n represents an integer of 0 to 3).

Polyorganosiloxane (H) is obtained by emulsion polymerizing cyclic organosiloxane under acidic conditions of pH of at most 5. Herein, cyclic organosiloxane is preferably represented by the formula:

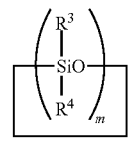

(wherein $R^3$ and $R^4$ respectively represent a hydrogen atom or a monovalent hydrocarbon group having 1 to 8 carbon atoms such as a methyl group, an ethyl group, a propyl group, a butyl group, a vinyl group, an allyl group and a phenyl group, m represents an integer of 3 to 8; in each repeating unit, $R^3$ and $R^4$ can be the same or different).

More specifically, examples are hexamethylcyclotrisiloxane, octamethylcyclotetrasiloxane, decamethylcyclopentasiloxane, 1,1-diethylhexamethylcyclotetrasiloxane, phenylheptamethylcyclotetrasiloxane, 1,1-diphenylhexamethylcyclotetrasiloxane, 1,2,3,4-tetravinyl-1,2,3,4-tetramethylcyclotetrasiloxane, 1,2,3,4-tetrahydro-1,2,3,4-tetramethylcyclotetrasiloxane, dodecamethylcyclohexasiloxane and 1,2,3,4-tetraphenyl-1,2,3,4-tetramethylcyclotetrasiloxane. Of these, octamethylcyclotetrasiloxane is preferable from the viewpoints of being easily available and cost.

The condensation reactive organosilane (I) is a component necessary for improving polymerization conversion ratio. The condensation reactive organosilane (I) in the present invention is not particularly limited as long as the condensation reactive organosilane is condensation reactive organosilane represented by the following formula (1):

(wherein $R^1$ represents an organic group, $R^2$ represents a hydrogen atom or an alkyl group having 1 to 5 carbon atoms, n represents an integer of 0 to 3) or a partially hydrolyzed condensate thereof. The composition of formula (1) is described below in further detail.

In the formula, $R^1$ is not particularly limited as long as $R^1$ represents any organic group. Specifically, examples are alkyl groups such as a methyl group, an ethyl group and a propyl group and aryl groups such as a phenyl group and a toluyl group.

$R^1$ can be a radical-polymerizable functional group described above or an alkyl group having the radical-polymerizable functional group. In such a case, condensation reactive organosilane (I) may comprise the same components as the alkoxysilane compound (J) described below. However, adding the same components as alkoxysilane compound (J) as condensation reactive organosilane (I) after conducting polycondensation of polyorganosiloxane (H) and alkoxysilane compound (J) is not particularly a problem, in the case that improvement in polymerization conversion ratio, which is an object of the present invention, is achieved.

In the formula, $R^2$ is not particularly limited as long as $R^2$ represents a hydrogen atom or an alkyl group having 1 to 5 carbon atoms. Herein, condensation reactive group $OR^2$ in the formula condenses with the silanol terminal of polyorganosiloxane (H) obtained by emulsion polymerization of cyclic organosiloxane. At this time, by reacting condensation reactive organosilane (I) with silanol in the terminal of organosiloxane having low molecular weight under acidic conditions, organosiloxane having low molecular weight can become nonvolatile matter and as a result, polymerization conversion ratio is considered to improve. However, from the viewpoints of selectivity of the reaction and inhibition of production of by-products such as scale particles, the condensation reactive group is preferably an alkyl group having 1 to 5 carbon atoms, more preferably 2 to 4 carbon atoms. When the number of carbon atoms is small, hydrolysis properties are high, selectivity of the reaction is low and scale particles may be produced. However, in the case that $R^1$ is an aryl group, because condensation reactivity is suppressed and selectivity of the reaction can be acquired, a hydrogen atom or an alkyl group having 1 to 5 carbon atoms can be preferably used.

Integer n in the formula determines the number of condensation reactive silanol groups (in the case that $R^2$ is a hydrogen group) or the number of alkoxy groups (in the case that $R^2$ is an alkyl group having 1 to 5 carbon atoms) and is a large factor in determining the properties of polyorganosiloxane particles contained in the obtained an emulsion of polyorganosiloxane.

When n=0 or 1, because condensation reactive organosilane (I) has 4 or 3 condensation reactive groups and functions as a crosslinking agent of polyorganosiloxane (H), rubber elasticity can be imparted to the obtained polyorganosiloxane particles. On the other hand, when n=2, the condensation reactive organosilane is difunctional condensation reactive organosilane and differs from the above case when n=0 or 1, as the condensation reactive organosilane does not function as a crosslinking agent and an emulsion of polyorganosiloxane containing particles of linear polyorganosiloxane can be obtained. The number of condensation reactive groups can be selected according to the desired properties.

The amount of condensation reactive organosilane (I) that is added in the present invention is preferably 0.1 to 50 parts by weight, more preferably 0.5 to 20 parts by weight based on 100 parts by weight of polyorganosiloxane (H). When the amount is too small, the effect of improving polymerization conversion ratio is not exhibited and when the amount is too large, problems may occur such as production of scale particles due to side reactions.

The alkoxysilane compound (J) in the present invention is an alkoxysilane compound having a radical-polymerizable functional group in a molecule and is a component necessary for obtaining the graft copolymer containing polyorganosiloxane described below.

The alkoxysilane compound (J) in the present invention is a compound having the structure shown in the following formula (2):

$$R^5(R^6)_m Si(OR^7)_{(3-m)} \quad (2)$$

(wherein $R^5$ represents an organic group having a radical-polymerizable functional group, $R^6$ represents any organic group, which can be the same as $R^5$, $R^7$ represents an alkyl group having 1 to 5 carbon atoms, m represents an integer of 0 or 1). Herein, radical-polymerizable functional group $R^5$ is not particularly limited, but a (meth)acryloyloxy group, a mercapto group, a vinyl group and a styryl group are preferable from the viewpoints of easily introducing functional groups and polymerization reactivity. As the alkoxysilane compound (J) component, more specific examples are silane compounds containing a (meth)acryloyloxy group such as γ-methacryloyloxypropyldimethoxymethylsilane, γ-methacryloyloxypropyltrimethoxysilane, γ-methacryloyloxypropyltriethoxysilane, γ-methacryloyloxypropyldiethoxymethylsilane, γ-acryloyloxypropyldimethoxymethylsilane and γ-acryloyloxypropyltrimethoxysilane; silane compounds containing a vinylphenyl group such as p-vinylphenyldimethoxymethylsilane and p-vinylphenyltrimethoxysilane; silane compounds containing a vinyl group such as vinylmethyldimethoxysilane, vinyltrimethoxysilane and vinyltriethoxysilane and silane compounds containing a mercapto group such as mercaptopropyltrimethoxysilane and mercaptopropyldimethoxymethylsilane. Of these, silane compounds containing a (meth)acryloyloxy group, silane compounds containing a vinyl group and silane compounds containing a mercapto group are preferably used from the viewpoint of economical efficiency.

Also, the alkoxysilane compound (J) wherein the number of alkoxy groups $OR^7$ bonded to a silicon atom is 2 (in the case that m=1 in formula 2) or 3 (in the case that m=0 in formula 2) is suitably used. When the number of alkoxy groups is 2, the polyorganosiloxane particles contained in the emulsion of polyorganosiloxane obtained by the present invention has a linear structure and when the number of alkoxy groups is 3, rubber elasticity can be imparted to the polyorganosiloxane particles, since the alkoxysilane compound (J) has function as a crosslinking agent.

The amount of alkoxysilane compound (J) is preferably 0.01 to 20 parts by weight, more preferably 0.1 to 10 parts by weight, based on 100 parts by weight of cyclic organosiloxane. When the amount is less than 0.01 part by weight, large agglomerate may develop when coagulating and thermally treating and powder properties of the resin may become poor. When the amount is more than 20 parts by weight, impact resistance of the final molded article may decrease.

In the present invention, a primary emulsion is obtained by homogeneously emulsifying cyclic organosiloxane and when necessary, preferably 0.01 to 20 parts by weight of alkoxysilane compound having a radical-polymerizable functional group in a molecule (J) based on 100 parts by weight of cyclic organosiloxane, together with a surfactant and water using an emulsifying instrument such as a homomixer, a colloid mill and a homogenizer and then emulsion polymerization is conducted. Herein, the amount of water that is used is not particularly limited, as long as the amount is sufficient for emulsifying organosiloxane of a low polymerization degree. Usually, the amount of water is 10 to 500 parts by weight based on 100 parts by weight of cyclic organosiloxane. When the amount of water is less than 10 parts by weight, the amount of organosiloxane of a low polymerization degree, which is hydrophobic oil, is too large and the emulsion does not invert from W/O to O/W. As a result, water has difficulty in becoming a continuous phase. When the amount is more than 500 parts by weight, stability tends to become poor. In emulsion polymerization, a surfactant that does not lose emulsifying ability under acidic conditions is suitably used. Examples are alkylbenzene sulfonic acid, sodium alkylbenzene sulfonate, alkylsulfonic acid, sodium alkylsulfonate, sodium (di)alkyl sulfosuccinate, sodium polyoxyethylene nonylphenylether sulfonate and sodium alkyl sulfide. These may be used alone or two or more kinds can be used in combination. Of these, alkylbenzene sulfonic acid, sodium alkylbenzene sulfonate, alkylsulfonic acid, sodium alkylsulfonate and sodium (di)alkyl sulfosuccinate are preferable from the viewpoint that emulsion stability of the emulsion is relatively high. Furthermore, alkylbenzene sulfonic acid and alkylsulfonic acid also function as a polymerization catalyst of the polyorganoiloxane forming component and therefore are particularly preferable.

The amount of the surfactant that is used is preferably an amount of 0.05 to 20% by weight, more preferably 0.1 to 10% by weight, in the primary emulsion. When the amount of the surfactant is too small, stability of the obtained emulsion tends to decrease and on the other hand, when the amount is too large, applications of the emulsion of polyorganosiloxane obtained by the present invention and the graft copolymer containing polyorganosiloxane obtained therefrom may be limited.

In the primary emulsion, emulsion polymerization is conducted while stirring to obtain polyorganosiloxane (H). Emulsion polymerization is preferably conducted under pH of at most 5 and the reaction temperature is preferably 30 to 95° C. When the temperature is lower than 30° C., the polymerization rate becomes slow and when the temperature is higher than 95° C., stability tends to become poor. When the polymerization time is less than 1 hour, polymerization is insufficient and when polymerization is conducted for more than 100 hours, the polymerization reaction does not progress further. Therefore, polymerization is preferably 1 to 100 hours, more preferably 5 to 50 hours. The pH during emulsion polymerization is preferably at most 5. When the pH is more than 5, progression of polymerization becomes slow and the conversion ratio tends to be unsatisfactory.

Usually, under acidic conditions, Si—O—Si bonds, which form the structure of polyorganosiloxane obtained by polymerization of cyclic organosiloxane, are in an equilibrium state of being decomposed and produced. Equilibrium changes according to the temperature and the lower the temperature is the easier the production of polyorganosiloxane having high molecular weight. Consequently, in polycondensation of polyorganosiloxane (H) and when necessary, alkoxysilane compound (J), in the present invention, heating is preferably stopped when the polymerization conversion ratio preferably reaches 75% to 89%, more preferably 82 to 89%, cooling is preferably conducted to a temperature below the polymerization temperature, specifically preferably 10 to 50° C., more preferably 20 to 45° C., and then aging is preferably conducted for at least 6 hours. When the temperature is lower than 10° C., a long period of time is required for cooling and productivity is poor. When the temperature is higher than 50° C., molecular weight of polyorganosiloxane may not be made sufficiently high by aging. Usually, neutralization is conducted by an alkali component such as sodium hydroxide, potassium hydroxide and sodium carbonate in order to stabilize the polyorganosiloxane chains. However, in the present invention, because polyorganosiloxane is reacted with condensation reactive organosilane (I), neutralization by an alkali component such as sodium hydroxide, potassium hydroxide and sodium carbonate does not necessarily need to be conducted. However, when storing for a long period of time or controlling the molecular weight of polyorganosiloxane within a narrow range, neutralization can be conducted when necessary and then the polyorganosiloxane emulsion can be adjusted to acidic conditions to prepare the polyorganosiloxane emulsion of the present invention.

Subsequently, 0.01 to 20 part by weight of condensation reactive organosilane (I) is added based on 100 parts by weight of the aged polyorganosiloxane (H). The temperature of the emulsion of polyorganosiloxane (H) when adding condensation reactive organosilane (I) is preferably 10 to 50° C., more preferably 20 to 45° C. When the temperature is higher than 50° C., side reactions prevail before reaction with silanol groups of polyorganosiloxane in a micell and the effect of improving polymerization conversion ratio cannot be obtained. Furthermore, because by-products such as scale particles are produced by hydrolysis and condensation of condensation reactive organosilane (I), properties of the emulsion of polyorganosiloxane and the graft copolymer containing polyorganosiloxane obtained therefrom may be adversely affected. Also, when the temperature is too low, a long period of time is required for cooling and reheating, thus being unfavorable in view of productivity.

The reaction temperature of condensation reactive organosilane (I) is preferably 30 to 95° C., more preferably 35 to 85° C. When the temperature is lower than 30° C., progression of the condensation reaction tends to be slow and the effect of improving conversion ratio tends to be insufficient. Also, condensation reactive organosilane (I) is preferably reacted under pH of at most 5. When the pH is more than 5, progression of the condensation reaction tends to be slow and the effect of improving conversion ratio tends to be insufficient.

In the present invention, polymerization conversion ratio refers to the conversion ratio of cyclic organosiloxane used when preparing polyorganosiloxane (H) to low volatile matter and is calculated from the solid content concentration when polymerizing. More specifically, the polymerization conversion ratio is calculated from the equation:

Polymerization conversion ratio=[(parts by weight of all components in emulsion)×(solid content concentration of polymerization emulsion)−(parts by weight of solid content other than cyclic organosiloxane)]/(parts by weight of cyclic organosiloxane)

Herein, solid content concentration refers to the proportion of remnant solid content, when approximately 1 to 2 g of the emulsion when polymerizing is placed in an ointment can and then heated and dried for 1 hour in an oven of 130° C. In the present invention, by adding condensation reactive organosilane (I), the polymerization conversion ratio of cyclic organosiloxane when preparing polyorganosiloxane (H) can be improved 5 to 10%. Also, development of by-products such as scale particles can be inhibited. Furthermore, new functions can imparted by the functional groups contained in condensation reactive organosilane (I).

The graft copolymer containing polyorganosiloxane obtained from the emulsion of polyorganosiloxane of the present invention is described below.

The graft copolymer containing polyorganosiloxane obtained by the present invention is compounded in various thermoplastic resins and thermosetting resins to provide a resin composition excellent in impact resistance.

The graft copolymer containing polyorganosiloxane of the present invention is obtained by polymerizing, preferably 5 to 70 parts by weight, more preferably 10 to 50 parts by weight of a vinyl monomer, in the presence of preferably 95 to 30 parts by weight, more preferably 90 to 50 parts by weight of polyorganosiloxane particles contained in the emulsion of polyorganosiloxane obtained by the present invention, so that the total amount becomes 100 parts by weight. When the amount of polyorganosiloxane particles is too small, the effect of properties of the graft copolymer as a whole that are exhibited by polyorganosiloxane (such as impact absorbency, flame retardancy, water repellency) are not exhibited. When the amount of the vinyl monomer is too little, favorable dispersability in the matrix resin may not be obtained.

Examples of the vinyl monomer are aromatic alkenyl compounds such as styrene and α-methylstyrene; methacrylic esters such as methyl methacrylate, ethyl methacrylate, 2-ethylhexyl methacrylate and butyl methacrylate; acrylic esters such as methyl acrylate, ethyl acrylate and butyl acrylate; cyanized vinyl compounds such as acrylonitrile and methacrylonitrile; olefins such as ethylene and propylene; conjugated diolefins such as butadiene, isoprene and chloroprene; vinyl acetate; vinyl chloride; allyl methacrylate; triallyl isocyanurate and ethylene dimethacrylate. These may be used alone or two or more kinds can be used together.

For graft polymerization, normal seed emulsion polymerization can be employed and radical polymerization of the vinyl monomer can be conducted in the emulsion of polyorganosiloxane obtained by the present invention. The vinyl monomer can be polymerized in one step or two or more steps.

Radical polymerization can be conducted by the method of advancing reaction by thermally decomposing the radical polymerization initiator or by reacting in a redox system using a reducing agent and is not particularly limited.

As the radical polymerization initiator, the same radical polymerization initiators as those described above can be used. Also, as the reducing agent used in the redox system, the same reducing agents as those described above can be used.

The amount of the radical polymerization initiator that is used is preferably 0.005 to 20 parts by weight, more preferably 0.01 to 10 parts by weight, particularly preferably 0.03 to 5 parts by weight based on 100 parts by weight of the vinyl monomer that is used. When the amount of the radical polymerization initiator is less than 0.005 part by weight, the reaction rate is slow and production efficiency tends to become poor. When the amount is more than 20 parts by weight, heat generation when reacting is large and preparation tends to become difficult.

Also, a chain transfer agent can be used when necessary in radical polymerization. The chain transfer can be any chain transfer agent that is usually used in emulsion polymerization and is not particularly limited.

Examples of the chain transfer agent are t-dodecylmercaptan, n-octylmercaptan, n-tetradecylmercaptan and n-hexylmercaptan.

The chain transfer agent is an optional component but the amount when used is preferably 0.01 to 5 parts by weight based on 100 parts by weight of the vinyl monomer. When the amount of the chain transfer agent is less than 0.01 part by weight, the effect of using the chain transfer agent cannot be obtained and when the amount is more than 5 parts by weight, the polymerization rate becomes slow and production efficiency tends to become low.

The reaction temperature when polymerizing is preferably 30 to 95° C.

The graft copolymer containing polyorganosiloxane obtained by emulsion polymerization can be used by separating polymers from the emulsion or the emulsion can be used as it is. An example of the method for separating the graft copolymer containing polyorganosiloxane is the method of coagulating by adding a metal salt such as calcium chloride, magnesium chloride and magnesium sulfate to the latex, separating, washing with water, dehydrating and drying the latex. Also, the spray drying method can be used.

Hereinafter, the present invention is described in detail by means of Examples but the present invention is not limited thereto. Measurement and tests in Examples and Comparative Examples were conducted in the following manner.

[Polymerization Conversion Ratio]

The amount of solid content of the latex was found by drying for 1 hour in a hot-air dryer of 120° C. and then the polymerization conversion ratio was calculated from 100× amount of solid content/amount of monomer (%).

[Volume Average Particle Size]

The volume average particle size of the seed polymer, polyorganosiloxane particles and the graft copolymer were measured in a latex state. The volume average particle size (μm) was measured by the light scattering method, using MICROTRAC UPA made by LEED & NORTHRUP INSTRUMENTS as the measurement instrument.

[Impact Resistance]

Impact resistance was evaluated according to ASTM D-256 by the Izod test at −10° C. in Examples 1 to 6 and Comparative Example 1 and the Izod test at 0° C. in Examples 13 to 18 and 24 to 28 and Comparative Examples 2 and 3 using a ⅛ inch bar having a notch.

[Flame Retardancy]

Flame retardancy was evaluated by UL94 V test.

[Swellability]

With respect to latex of the seed polymer, particle size was measured by MICROTRAC UPA. A liquid obtained by mixing and emulsifying organosiloxane (octamethylcyclotetrasiloxane) in an amount of 50 times (by weight) of the seed polymer (solid content) and the same amount of a 0.1% by weight aqueous solution of Emar 2F (Kao Corporation) was mixed in 5% by weight latex of the seed polymer. Then, the mixture was stirred for 1 hour at 23° C. and the particle size was measured by MICROTRAC UPA.

The swelling volume ratio was measured from the following equation.

Swelling volume ratio=(particle size after swelling)/(particle size before swelling)$^3$−1

[Tg]

The Tg of the seed polymer was found by differential thermal analysis (DTA).

Examples 1 to 3, 5 and 6

A five-neck flask equipped with a stirrer, a reflux condenser, a nitrogen injecting mouth, a monomer adding mouth and a thermometer was charged with 300 parts by weight of deionized water and sodium dodecylbenzenesulfonate (SDBS) in the amount (solid content) shown in Table 1. After mixing, the temperature was raised to 50° C. and when the temperature of the liquid reached 50° C., the inside of the flask was replaced with nitrogen. Then, 10 parts by weight of a mixed solution of butyl acrylate and styrene compounded in the ratio shown in Table 1 and 0.01 part by weight of para-menthane hydroperoxide was added. 30 minutes later, 0.002 part by weight of ferrous sulfate ($FeSO_4.7H_2O$), 0.005 part by weight of disodium ethylenediaminetetraacetate and 0.2 part by weight of sodium formaldehyde sulfoxylate were added and polymerization was conducted further for 1 hour. Thereafter, a mixed solution containing 90 parts by weight of the mixed solution of butyl acrylate and styrene compounded in the ratio shown in Table 1 and 0.1 part by weight of para-menthane hydroperoxide was added continuously over 3 hours. 2 hours of post-polymerization was conducted and latex of a seed polymer (seed 1 to 5) was obtained. The volume average particle size and degree of swelling after synthesis was measured and the results are shown in Table 1.

A five-neck flask equipped with a stirrer, a reflux condenser, a nitrogen injecting mouth, a monomer adding mouth and a thermometer was charged with 2 parts by weight of the seed polymer shown in Table 2. Then, a mixture comprising the components of 300 parts by weight of deionized water, 0.5 part by weight (solid content) of SDBS, 95 parts by weight of octamethylcyclotetrasiloxane and 5 parts by weight of mercaptopropyldimethoxymethylsilane (MPDS) was stirred for 5 minutes at 7000 rpm by a homomixer to prepare an emulsion and the emulsion was added all at once to the flask.

Then, 1 part by weight (solid content) of a 10% aqueous solution of dodecylbenzenesulfonic acid was added and the temperature was raised to 80° C. under nitrogen current while stirring. After stirring for 6 hours at 80° C., the mixture was cooled to 25° C. and left for 20 hours. Thereafter, pH was adjusted to 6.5 by sodium hydroxide and polymerization was completed to obtain latex of polyorganosiloxane.

Subsequently, a five-neck flask equipped with a stirrer, a reflux condenser, a nitrogen injecting mouth, a monomer adding mouth and a thermometer was charged with 240 parts by weight of deionized water and 70 parts by weight (solid content) of the above polyorganosiloxane particles and the temperature was raised to 40° C. under nitrogen current while stirring. When the temperature reached 40° C., 0.2 part by weight of sodium formaldehyde sulfoxylate (SFS), 0.01 part by weight of disodium ethylenediaminetetraacetate (EDTA) and 0.0025 part by weight of ferrous sulfate were added. Then, a mixture of 3 parts by weight of allyl methacrylate (ALMA) and 0.01 part by weight (solid content) of cumene hydroperoxide was added all at once and stirring was continued for 1 hour at 40° C. Thereafter, a mixture of 30 parts by weight of methyl methacrylate (MMA) and 0.06 part by weight (solid content) of cumene hydroperoxide was added by dropping over 1.5 hours. After adding, stirring was continued for 1 hour to obtain latex of a graft copolymer. The volume average particle size is shown in Table 2.

Then, the latex was diluted with deionized water so that the solid content concentration becomes 15% and then 4 parts by weight (solid content) of a 25% aqueous solution of calcium chloride was added to obtain a coagulated slurry. After heating to 95° C., the coagulated slurry was cooled to 50° C., dehydrated and then dried to obtain powder of polyorganosiloxane graft copolymer.

Thereafter, polycarbonate resin (Tarflon® FN 1900A, available from Idemitsu Petrochemical Co., Ltd.) and the above powder of polyorganosiloxane graft copolymer were compounded in the composition shown in Table 2. The anti-dropping agent refers to polytetrafluoroethylene (Polyflon FA-500, available from Daikin Industries, Ltd.) and the stabilizer refers to a mixture of a phosphorous-type antioxidant (Adeka Stub PEP36, available from Asahi Denka Co., Ltd.) and a phenol-type antioxidant (Topanol Calif., available from ICI Japan Co., Ltd.).

The obtained compound was melted and kneaded at 270° C. by a twin-screw extruder (TEX 44SS, made by The Japan Steel Works, Ltd.) to prepare pellets. From the obtained pellets, specimen of ⅛ inch for evaluating impact resistance and specimen of ¹/₁₆ inch for evaluating flame retardancy were prepared using injection molding machine FAS 100B made by Fanuc Ltd. wherein the cylinder temperature was set to 280° C. Evaluation was conducted according to the evaluation methods described above using the obtained specimen. The results of impact resistance and flame retardancy of the molded article are shown in Table 2.

Example 4

Synthesis, coagulation, thermal treatment, dehydration and drying to obtain powder, compounding, molding and evaluation were conducted in the same manner as in Example 1, except that the seed polymer was not added when polymerizing latex of polyorganosiloxane. The results are shown in Table 2.

Comparative Example 1

Compounding, molding and evaluation were conducted in the same manner as in Example 1, except that the polyorganosiloxane graft copolymer was not added in the polycarbonate resin. The results are shown in Table 2.

TABLE 1

|  | Seed | | | | |
|---|---|---|---|---|---|
|  | 1 | 2 | 3 | 4 | 5 |
| Sodium dodecylbenzene sulfonate (phr) | 24 | 16 | 16 | 6 | 6 |
| Butyl acrylate (%) | 100 | 100 | 80 | 100 | 0 |
| Styrene (%) | 0 | 0 | 20 | 0 | 100 |
| Glass transition temperature (° C.) | −45 | −45 | −15 | 105 | −45 |
| Average particle size (μm) | 0.008 | 0.02 | 0.02 | 0.05 | 0.05 |
| Swelling volume ratio (times) | 20 | 15 | 12 | 1 | 0.5 |

TABLE 2

|  | Ex. | | | | | | Com. Ex. |
|---|---|---|---|---|---|---|---|
|  | 1 | 2 | 3 | 4 | 5 | 6 | 1 |
| Composition | | | | | | | |
| Polycarbonate (part(s)) | 100 | 100 | 100 | 100 | 100 | 100 | 100 |
| Anti-dropping agent (part(s)) | 0.3 | 0.3 | 0.3 | 0.3 | 0.3 | 0.3 | 0.3 |
| Stabilizer (part(s)) | 0.6 | 0.6 | 0.6 | 0.6 | 0.6 | 0.6 | 0.6 |
| Amount of flame retardant (part(s)) | 3 | 3 | 3 | 3 | 3 | 3 | — |
| Flame retardant | | | | | | | |
| Seed polymer | Seed 1 | Seed 2 | Seed 3 | — | Seed 4 | Seed 5 | — |
| Amount of seed (part(s)) | 2 | 2 | 2 | — | 2 | 2 | — |
| Grafting agent | MPDS | MPDS | MPDS | MPDS | MPDS | MPDS | — |
| One-step graft | ALMA | ALMA | ALMA | ALMA | ALMA | ALMA | — |

TABLE 2-continued

|  | Ex. | | | | | | Com. Ex. |
| --- | --- | --- | --- | --- | --- | --- | --- |
|  | 1 | 2 | 3 | 4 | 5 | 6 | 1 |
| Second-step graft | MMA | MMA | MMA | MMA | MMA | MMA | — |
| Average particle size (μm) | 0.23 | 0.23 | 0.25 | 0.2 | 0.2 | 0.2 | — |
| Properties |  |  |  |  |  |  |  |
| Impact resistance |  |  |  |  |  |  |  |
| Izod Strength (kJ/m$^2$) | 20 | 20 | 20 | 20 | 20 | 20 | 14 |
| Flame retardancy |  |  |  |  |  |  |  |
| Time for complete combustion (sec) | 40 | 45 | 45 | 90 | 90 | 80 | 130 |
| UL94V evaluation | V-0 | V-0 | V-0 | V-2 | V-2 | V-2 | Not-V |

Preparation Example 1

A five-neck flask equipped with a stirrer, a reflux condenser, a nitrogen injecting mouth, a monomer adding mouth and a thermometer was charged with 300 parts by weight of deionized water and 8 parts by weight (solid content) of sodium dodecylbenzenesulfonate (SDBS). After mixing, the temperature was raised to 50° C. and after the temperature of the liquid reached 50° C., the inside of the flask was replaced with nitrogen. Then, 10 parts by weight of butyl acrylate (BA), 3 parts by weight of t-dodecylmercaptan (tDM) and 0.01 part by weight of para-menthane hydroperoxide were added. 30 minutes later, 0.002 part by weight of ferrous sulfate (FeSO$_4$.7H$_2$O), 0.005 part by weight of disodium ethylenediaminetetraacetate and 0.2 part by weight of sodium formaldehyde sulfoxylate were added and polymerization was conducted further for 1 hour. Thereafter, a mixed solution of 90 parts by weight of butyl acrylate, 27 parts by weight of t-dodecylmercaptan (tDM) and 0.1 part by weight of para-menthane hydroperoxide was added continuously over 3 hours. 2 hours of post-polymerization was conducted and latex of a seed polymer (SE-1) was obtained. The polymerization ratio of the obtained latex of the seed polymer was 92% by weight and the volume average particle size was 0.04 μm.

Preparation Example 2

A five-neck flask equipped with a stirrer, a reflux condenser, a nitrogen injecting mouth, a monomer adding mouth and a thermometer was charged with 2 parts by weight (solid content) of the seed polymer of Preparation Example 1 (SE-1). Then, a mixture comprising the components of 300 parts by weight of deionized water, 0.5 part by weight (solid content) of sodium dodecylbenzenesulfonate (SDBS), 98 parts by weight of octamethylcyclotetrasiloxane (D4) and 5 parts by weight of mercaptopropyldimethoxymethylsilane (MPrDMS) was stirred for 5 minutes at 7000 rpm by a homo-mixer to prepare an emulsion and the emulsion was added all at once to the flask.

Then, 1 part by weight (solid content) of a 10% aqueous solution of dodecylbenzenesulfonic acid was added and the temperature was raised to 80° C. under nitrogen current while stirring. After stirring for 15 hours at 80° C., the mixture was cooled to 25° C. and left for 30 hours. Thereafter, pH was adjusted to 6.5 by sodium hydroxide and polymerization was completed to obtain latex of polyorganosiloxane (SR-1). The polymerization ratio of the obtained latex of polyorganosiloxane was 85% by weight and the volume average particle size was 0.28 μm.

Examples 7 to 12

A five-neck flask equipped with a stirrer, a reflux condenser, a nitrogen injecting mouth, a monomer adding mouth and a thermometer was charged with 80 parts by weight (solid content) of the polyorganosiloxane particles obtained in Preparation Example 2 and the temperature was raised to 40° C. under nitrogen current while stirring. When the temperature reached 40° C., 0.39 part by weight of sodium formaldehyde sulfoxylate (SFS), 0.004 part by weight of disodium ethylenediaminetetraacetate (EDTA) and 0.001 part by weight of ferrous sulfate were added. Then, 3 parts by weight of allyl methacrylate (ALMA) and RY-1 to 6 shown in Table 3 in the amounts shown in Table 4 ($2.11 \times 10^{-4}$ mol) were mixed and then added all at once and stirring was continued for 1 hour at 40° C. Thereafter, 30 parts by weight of methyl methacrylate (MMA) and RY-1 to 6 shown in Table 3 in the amounts shown in Table 4 ($4.21 \times 10^{-4}$ mol) were mixed and the mixture was added by dropping over 1.5 hours. After adding, stirring was continued for 3 hours to obtain latex of a graft copolymer. The polymerization ratio and volume average particle size of the obtained latex of a graft copolymer are shown in Table 4.

Subsequently, the latex was diluted with deionized water so that the solid content concentration becomes 15% and then 4 parts by weight (solid content) of a 2.5% aqueous solution of calcium chloride was added to obtain a coagulated slurry. After heating to 95° C., the coagulated slurry was cooled to 50° C., dehydrated and then dried to obtain powder of polyorganosiloxane graft copolymer (SG-1 to 6).

Examples 13 to 18

Polycarbonate resin (product name: Panlite® L1225 WX, Teijin Chemicals, Ltd.), polytetrafluoroethylene (Polyflon FA-500, available from Daikin Industries, Ltd.) as the anti-dropping agent and powder of polyorganosiloxane graft copolymer obtained in Examples 7 to 12 (SG-1 to 6) were compounded in the composition shown in Table 5.

The obtained compound was melted and kneaded at 270° C. by a twin-screw extruder (TEX 44SS, made by The Japan Steel Works, Ltd.) to prepare pellets. From the obtained pellets, specimen of ½0 inch for evaluating flame retardancy and specimen of ⅛ inch for evaluating impact resistance were prepared using injection molding machine FAS 100B made by Fanuc Ltd. wherein the cylinder temperature was set to 280° C. Evaluation was conducted according to the evaluation methods described above using the obtained specimen. The results of impact resistance and flame retardancy of the molded article are shown in Table 5.

Comparative Example 2

Compounding, molding and evaluation were conducted in the same manner as in Example 13, except that the powder of polyorganosiloxane graft copolymer was not added. The results are shown in Table 5.

TABLE 3

|  | Initiator No. | Solubility to water at 20° C. (g/100 g of water) | Hydrogen drawing properties MSD trapping method (%) | Molecular weight |
|---|---|---|---|---|
| t-hexyl hydroperoxide | RY-1 | 2 | 20 | 118 |
| p-menthane hydroperoxide | RY-2 | 1.6 | 23 | 172 |
| t-butyl hydroperoxide | RY-3 | 15.7 | 19 | 90 |
| t-hexylperoxyisopropyl monocarbonate | RY-4 | 0.01 | 19 | 204 |
| cumene hydroperoxide | RY-5 | 1.6 | 48 | 152 |
| t-butylperoxyisopropyl monocarbonate | RY-6 | 0.02 | 47 | 176 | by weight of deionized water, 0.5 part by weight (solid content) of sodium dodecylbenzenesulfonate (SDBS), 98 parts by weight of octamethylcyclotetrasiloxane (D4) and 4 parts by weight of mercaptopropyldimethoxymethylsilane (MPrDMS) was stirred for 5 minutes at 7000 rpm by a homomixer to prepare an emulsion and the emulsion was added all at once to the flask.

Then, 1 part by weight (solid content) of a 10% aqueous solution of dodecylbenzenesulfonic acid was added and the temperature was raised to 80° C. under nitrogen current while stirring. After stirring for 15 hours at 80° C., the mixture was cooled to 25° C. and left for 30 hours.

Subsequently, the temperature was raised to 40° C. under nitrogen current while stirring the polyorganosiloxane particles. After the temperature reached 40° C., a mixture comprising the components of 5.2 parts by weight of deionized water, 1 part by weight of mercaptopropyldimethoxymethylsilane (MPrDMS) and 0.005 part by weight (solid content) of sodium dodecylbenzenesulfonate was stirred for 30 minutes with a stirrer to prepare an emulsion. The prepared emulsion was added all at once and stirring was continued for 5 minutes. Thereafter, 0.06 part by weight of sodium formal-

TABLE 4

|  |  | Ex. 7 | Ex. 8 | Ex. 9 | Ex. 10 | Ex. 11 | Ex. 12 |
|---|---|---|---|---|---|---|---|
| Polyorganosiloxane particles (A) (part(s)) | SR-1 | 80 | 80 | 80 | 80 | 80 | 80 |
| Vinyl monomer (B) (part(s)) | ALMA | 3 | 3 | 3 | 3 | 3 | 3 |
|  | RY | RY-1 | RY-2 | RY-3 | RY-4 | RY-5 | RY-6 |
|  | $2.11 \times 10^{-4}$ mol | 0.025 | 0.037 | 0.019 | 0.043 | 0.032 | 0.037 |
| Vinyl monomer (C) (part(s)) | MMA | 20 | 20 | 20 | 20 | 20 | 20 |
|  | RY | RY-1 | RY-2 | RY-3 | RY-4 | RY-5 | RY-6 |
|  | $4.21 \times 10^{-4}$ mol | 0.05 | 0.072 | 0.038 | 0.086 | 0.064 | 0.074 |
| Polymerization ratio (%) | Vinyl monomer (B) after reaction | 99 | 99 | 99 | 99 | 99 | 99 |
|  | Vinyl monomer (C) after reaction | 99 | 99 | 99 | 99 | 99 | 99 |
| Particle size (μm) |  | 0.29 | 0.29 | 0.29 | 0.29 | 0.29 | 0.29 |
| Graft copolymer No. |  | SG-1 | SG-2 | SG-3 | SG-4 | SG-5 | SG-6 |

TABLE 5

|  |  | Ex. 13 | Ex. 14 | Ex. 15 | Ex. 16 | Ex. 17 | Ex. 18 | Com. Ex. 2 |
|---|---|---|---|---|---|---|---|---|
| Thermoplastic resin (part(s)) | Polycarbonate | 100 | 100 | 100 | 100 | 100 | 100 | 100 |
| Graft copolymer (part(s)) | SG-1 | 3 | — | — | — | — | — | — |
|  | SG-2 | — | 3 | — | — | — | — | — |
|  | SG-3 | — | — | 3 | — | — | — | — |
|  | SG-4 | — | — | — | 3 | — | — | — |
|  | SG-5 | — | — | — | — | 3 | — | — |
|  | SG-6 | — | — | — | — | — | 3 | — |
| Anti-dropping agent (part(s)) | Polytetrafluoroethylene | 0.5 | 0.5 | 0.5 | 0.5 | 0.5 | 0.5 | 0.5 |
| Flame retardancy of 1.2 mm thickness molded article | Time for complete combustion (sec) | 40 | 45 | 92 | 61 | 62 | 52 | 90 |
|  | Dripping | None | None | Yes | None | Yes | Yes | Yes |
|  | Evaluation | V-0 | V-0 | V-2 | V-1 | V-1 | V-1 | Not-V |
| Impact resistance ⅛ inc Izod Strength | 0° C. (kJ/m²) | 24 | 24 | 24 | 20 | 24 | 24 | 14 |

Preparation Example 3

A five-neck flask equipped with a stirrer, a reflux condenser, a nitrogen injecting mouth, a monomer adding mouth and a thermometer was charged with 2 parts by weight (solid content) of the seed polymer of Preparation Example 1 (SE-1). Then, a mixture comprising the components of 300 parts dehyde sulfoxylate (SFS), 0.0006 part by weight disodium ethylenediaminetetraacetate (EDTA) and 0.00015 part by weight of ferrous sulfate were added and then a mixture of 3.8 parts by weight of allyl methacrylate (ALMA) and 0.1 part by weight (solid content) of t-butylperoxyisopropylcarbonate (RY-6) was added all at once. Stirring was continued for 3 hours at 40° C. Thereafter, pH was adjusted to 6.5 by sodium hydroxide and polymerization was completed to obtain latex of polyorganosiloxane (SR-2). The polymerization ratio and the volume average particle size of the obtained latex of polyorganosiloxane are shown in Table 6.

Preparation Example 4

Latex of polyorganosiloxane (SR-3) was obtained by synthesizing in the same manner as in Preparation Example 3, except that the amount of mercaptopropyldimethoxymethylsilane (MPrDMS) that is added at the same time as octamethylcyclotetrasiloxane (D4) was 3 parts by weight and the components of the emulsion that is added after cooling, leaving and heating was 10.5 parts by weight of deionized water, 2 parts by weight of mercaptopropyldimethoxymethylsilane (MPrDMS) and 0.01 part by weight (solid content) sodium dodecylbenzenesulfonate (SDBS). The polymerization ratio and the volume average particle size of the obtained latex of polyorganosiloxane are shown in Table 6.

Preparation Example 5

Latex of polyorganosiloxane (SR-4) was obtained by synthesizing in the same manner as in Preparation Example 3, except that the amount of mercaptopropyldimethoxymethylsilane (MPrDMS) that is added at the same time as octamethylcyclotetrasiloxane (D4) was 2 parts by weight and the components of the emulsion that is added after cooling, leaving and heating was 15.7 parts by weight of deionized water, 3 parts by weight of mercaptopropyldimethoxymethylsilane (MPrDMS) and 0.015 part by weight (solid content) sodium dodecylbenzenesulfonate (SDBS). The polymerization ratio and the volume average particle size of the obtained latex of polyorganosiloxane are shown in Table 6.

Preparation Example 6

Latex of polyorganosiloxane (SR-5) was obtained by synthesizing in the same manner as in Preparation Example 3, except that the amount of mercaptopropyldimethoxymethylsilane (MPrDMS) that is added at the same time as octamethylcyclotetrasiloxane (D4) was 5 parts by weight and the emulsion was not added after cooling, leaving and heating. The polymerization ratio and the volume average particle size of the obtained latex of polyorganosiloxane are shown in Table 6.

Preparation Example 7

Latex of polyorganosiloxane (SR-6) was obtained by synthesizing in the same manner as in Preparation Example 3, except that the amount of mercaptopropyldimethoxymethylsilane (MPrDMS) that is added at the same time as octamethylcyclotetrasiloxane (D4) was 0 parts by weight and the components of the emulsion that is added after cooling, leaving and heating was 26.2 parts by weight of deionized water, 5 parts by weight of mercaptopropyldimethoxymethylsilane (MPrDMS) and 0.025 part by weight (solid content) sodium dodecylbenzenesulfonate (SDBS). The polymerization ratio and the volume average particle size of the obtained latex of polyorganosiloxane are shown in Table 6.

Examples 19 to 23

A five-neck flask equipped with a stirrer, a reflux condenser, a nitrogen injecting mouth, a monomer adding mouth and a thermometer was charged with 70 parts by weight (solid content) of polyorganosiloxane particles shown in Table 7 and the temperature was raised to 40° C. under nitrogen current while stirring. When the temperature reached 40° C., 0.39 part by weight of sodium formaldehyde sulfoxylate (SFS), 0.004 part by weight of disodium ethylenediaminetetraacetate (EDTA) and 0.001 part by weight of ferrous sulfate were added. Then, a mixture of 3 parts by weight of allyl methacrylate (ALMA) and 0.11 part by weight (solid content) of p-menthane hydroperoxide (RY-2) was added all at once and stirring was continued for 1 hour at 40° C. Thereafter, a mixture of 30 parts by weight of methyl methacrylate (MMA) and 0.23 part by weight of p-menthanehydroperoxide (RY-2) was added by dropping over 1.5 hours. After adding, stirring was continued for 3 hours to obtain latex of a graft copolymer. The polymerization ratio and volume average particle size of the obtained latex of a graft copolymer are shown in Table 7.

Subsequently, the latex was diluted with deionized water so that the solid content concentration becomes 15% and then 4 parts by weight (solid content) of a 2.5% aqueous solution of calcium chloride was added to obtain a coagulated slurry. After heating to 95° C., the coagulated slurry was cooled to 50° C., dehydrated and then dried to obtain powder of polyorganosiloxane graft copolymer (SG-7 to 11).

Examples 24 to 28

Polycarbonate resin (product name: Panlite® L1225 WX, Teijin Chemicals, Ltd.), polytetrafluoroethylene (Polyflon FA-500, available from Daikin Industries, Ltd.) as the anti-dropping agent and powder of polyorganosiloxane graft copolymer obtained in Examples 19 to 23 (SG-7 to 11) were compounded in the composition shown in Table 8.

The obtained compound was melted and kneaded at 270° C. by a twin-screw extruder (TEX 44SS, made by The Japan Steel Works, Ltd.) to prepare pellets. From the obtained pellets, specimen of 1/20 inch for evaluating flame retardancy and specimen of 1/8 inch for evaluating impact resistance were prepared using injection molding machine FAS 100B made by Fanuc Ltd. wherein the cylinder temperature was set to 280° C. Evaluation was conducted according to the evaluation methods described above using the obtained specimen. The results of impact resistance and flame retardancy of the molded article are shown in Table 8.

Comparative Example 3

Compounding, molding and evaluation were conducted in the same manner as in Example 24, except that the powder of polyorganosiloxane graft copolymer was not added. The results are shown in Table 8.

TABLE 6

|  |  | Prep. Ex. | | | | |
|---|---|---|---|---|---|---|
|  |  | 3 | 4 | 5 | 6 | 7 |
| Polyorganosiloxane (A) (part(s)) | SE-1 | 2 | 2 | 2 | 2 | 2 |
|  | D4 | 98 | 98 | 98 | 98 | 98 |
|  | MPrDMS | 4 | 3 | 2 | 5 | 0 |
| Grafting agent (F) (part(s)) | MPrDMS | 1 | 2 | 3 | 0 | 5 |

TABLE 6-continued

|  |  | Prep. Ex. | | | | |
| --- | --- | --- | --- | --- | --- | --- |
|  |  | 3 | 4 | 5 | 6 | 7 |
| Vinyl monomer (B) (part(s)) | ALMA | 3.8 | 3.8 | 3.8 | 3.8 | 3.8 |
|  | RY-6 | 0.1 | 0.1 | 0.1 | 0.1 | 0.1 |
| Polymerization ratio of monomer (%) | Vinyl monomer (B) after reaction | 99 | 99 | 99 | 99 | 99 |
| Polymerization ratio of D4 (%) | Polyorganosiloxane (A) after preparation | 85 | 85 | 85 | 85 | 85 |
|  | Vinyl monomer (B) after reaction | 89 | 88 | 87.5 | 88.5 | 86.5 |
| Particle size (μm) |  | 0.23 | 0.24 | 0.24 | 0.23 | 0.25 |
| Polyorganosiloxane particle No. |  | SR-2 | SR-3 | SR-4 | SR-5 | SR-6 |

TABLE 7

|  |  | Ex. | | | | |
| --- | --- | --- | --- | --- | --- | --- |
|  |  | 19 | 20 | 21 | 22 | 23 |
| Polyorganosiloxane (A) (part(s)) | SR-2 | 70 | — | — | — | — |
|  | SR-3 | — | 70 | — | — | — |
|  | SR-4 | — | — | 70 | — | — |
|  | SR-5 | — | — | — | 70 | — |
|  | SR-6 | — | — | — | — | 70 |
| Vinyl monomer (G) (part(s)) | ALMA | 3 | 3 | 3 | 3 | 3 |
|  | RY-2 | 0.11 | 0.11 | 0.11 | 0.11 | 0.11 |
| Vinyl monomer (C) (part(s)) | MMA | 30 | 30 | 30 | 30 | 30 |
|  | RY-2 | 0.23 | 0.23 | 0.23 | 0.23 | 0.23 |
| Polymerization ratio of octamethylcyclotetrasiloxane |  | 91 | 91 | 88 | 90 | 87 |
| Particle size (μm) |  | 0.24 | 0.25 | 0.25 | 0.24 | 0.25 |
| Graft copolymer No. |  | SG-7 | SG-8 | SG-9 | SG-10 | SG-11 |

TABLE 8

|  |  | Ex. | | | | | Com. Ex. |
| --- | --- | --- | --- | --- | --- | --- | --- |
|  |  | 24 | 25 | 26 | 27 | 28 | 3 |
| Thermoplastic resin (part(s)) | Polycarbonate | 100 | 100 | 100 | 100 | 100 | 100 |
| Graft copolymer (part(s)) | SG-7 | 3 | — | — | — | — | — |
|  | SG-8 | — | 3 | — | — | — | — |
|  | SG-9 | — | — | 3 | — | — | — |
|  | SG-10 | — | — | — | 3 | — | — |
|  | SG-11 | — | — | — | — | 3 | — |
| Anti-dropping agent (part(s)) | Polytetrafluoroethylene | 0.5 | 0.5 | 0.5 | 0.5 | 0.5 | 0.5 |
| Flame retardancy of 1.2 mm thickness molded article | Time for complete combustion (sec) | 31 | 28 | 45 | 59 | 67 | 90 |
|  | Dripping | None | None | None | None | Yes | Yes |
|  | Evaluation | V-0 | V-0 | V-0 | V-1 | Not-V | Not-V |
| Impact resistance ⅛ inc Izod Strength | 0° C. (kJ/m²) | 42 | 49 | 35 | 35 | 23 | 12 |

Preparation Example 8

A mixture comprising 300 parts by weight of deionized water, 0.5 part by weight (solid content) of a 5% aqueous solution of sodium dodecylbenzenesulfonate and 100 parts by weight of octamethylcyclotetrasiloxane was stirred for 5 minutes at 7000 rpm by a homomixer to prepare a primary emulsion of polyorganosiloxane. The emulsion was added all at once to a five-neck flask equipped with a stirrer, a reflux condenser, a nitrogen injecting mouth, a monomer adding mouth and a thermometer.

Then, 1 part by weight (solid content) of a 10% aqueous solution of dodecylbenzenesulfonic acid was added and the temperature was raised to 80° C. under nitrogen current while stirring the system. When the temperature reached 80° C., stirring was continued for 6 hours at 80° C. and then the mixture was cooled to 25° C. and left for 20 hours. The polymerization conversion ratio of cyclic organosiloxane was 83%. The pH of the emulsion was approximately 2.

Preparation Example 9

A mixture comprising components of 300 parts by weight of deionized water, 0.5 part by weight (solid content) of a 5% aqueous solution of sodium dodecylbenzenesulfonate, 100 parts by weight of octamethylcyclotetrasiloxane and 5 parts by weight of mercaptopropyldimethoxymethylsilane was stirred for 5 minutes at 7000 rpm by a homomixer to prepare the primary emulsion of polyorganosiloxane. The emulsion was added all at once to a five-neck flask equipped with a stirrer, a reflux condenser, a nitrogen injecting mouth, a monomer adding mouth and a thermometer.

Then, 1 part by weight (solid content) of a 10% aqueous solution of dodecylbenzenesulfonic acid was added and the temperature was raised to 80° C. under nitrogen current while stirring the system. When the temperature reached 80° C., stirring was continued for 6 hours at 80° C. and then the mixture was cooled to 25° C. and left for 20 hours. The polymerization conversion ratio of cyclic organosiloxane was 85%. The pH of the emulsion was approximately 2.

Example 29

To the emulsion of polyorganosiloxane obtained in Preparation Example 8, partially hydrolyzed condensate of tetramethoxysilane (product name: Methyl silicate 51, available from Tama Chemicals Co., Ltd.) was added in an amount equivalent to 5 parts by weight based on 100 parts by weight of the octamethylcyclotetrasiloxane that was used and reaction was conducted for 3 hours at 60° C. The pH when reacting was 2. After the reaction was finished, pH was adjusted to 6.9 by sodium hydrogen carbonate. The temperature of the emulsion of polyorganosiloxane when adding Methyl silicate 51 was 25° C.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Example 30

To the emulsion of polyorganosiloxane obtained in Preparation Example 8, tetraethoxysilane was added in an amount equivalent to 5 parts by weight based on 100 parts by weight of the octamethylcyclotetrasiloxane that was used and reacted for 3 hours at 80° C. The pH when reacting was 2. After the reaction was finished, the pH was adjusted to 6.9 by sodium hydrogen carbonate. The temperature of the emulsion of polyorganosiloxane when adding tetraethoxysilane was 25° C.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Example 31

To the emulsion of polyorganosiloxane obtained in Preparation Example 8, diphenyldimethoxysilane was added in an amount equivalent to 3 parts by weight based on 100 parts by weight of the octamethylcyclotetrasiloxane that was used and reacted for 3 hours at 80° C. The pH when reacting was 2. After the reaction was finished, the pH was adjusted to 6.9 by sodium hydrogen carbonate. The temperature of the emulsion of polyorganosiloxane when adding diphenyldimethoxysilane was 25° C. Evaluation of polymerization conversion ratio and scale amount are shown in Table 9.

Example 32

To the emulsion of polyorganosiloxane obtained in Preparation Example 8, mercaptopropyltrimethoxysilane was added in an amount equivalent to 5 parts by weight based on 100 parts by weight of the octamethylcyclotetrasiloxane that was used and reacted for 3 hours at 60° C. The pH when reacting was 2. After the reaction was finished, the pH was adjusted to 6.9 by sodium hydrogen carbonate. The temperature of the emulsion of polyorganosiloxane when adding mercaptopropyltrimethoxysilane was 25° C.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Example 33

To the emulsion of polyorganosiloxane obtained in Preparation Example 9, partially hydrolyzed condensate of tetramethoxysilane (product name: Methyl silicate 51, available from Tama Chemicals Co., Ltd.) was added in an amount equivalent to 5 parts by weight based on 100 parts by weight of the octamethylcyclotetrasiloxane that was used and reacted for 3 hours at 60° C. The pH when reacting was 2. After the reaction was finished, the pH was adjusted to 6.9 by sodium hydrogen carbonate. The temperature of the emulsion of polyorganosiloxane when adding Methyl silicate 51 was 25° C.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Example 34

To the emulsion of polyorganosiloxane obtained in Preparation Example 9, tetraethoxysilane was added in an amount equivalent to 5 parts by weight based on 100 parts by weight of the octamethylcyclotetrasiloxane that was used and reacted for 3 hours at 80° C. The pH when reacting was 2. After the reaction was finished, the pH was adjusted to 6.9 by sodium hydrogen carbonate. The temperature of the emulsion of polyorganosiloxane when adding tetraethoxysilane was 25° C.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Example 35

To the emulsion of polyorganosiloxane obtained in Preparation Example 9, diphenyldimethoxysilane was added in an amount equivalent to 3 parts by weight based on 100 parts by weight of the octamethylcyclotetrasiloxane that was used and reacted for 3 hours at 80° C. The pH when reacting was 2. After the reaction was finished, the pH was adjusted to 6.9 by sodium hydrogen carbonate. The temperature of the emulsion of polyorganosiloxane when adding diphenylmethoxysilane was 25° C.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Example 36

To the emulsion of polyorganosiloxane obtained in Preparation Example 9, mercaptopropyltrimethoxysilane was added in an amount equivalent to 5 parts by weight based on 100 parts by weight of the octamethylcyclotetrasiloxane that was used and reacted for 3 hours at 60° C. The pH when reacting was 2. After the reaction was finished, the pH was adjusted to 6.9 by sodium hydrogen carbonate.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9.

Comparative Example 4

A mixture comprising 300 parts by weight of deionized water, 0.5 part by weight (solid content) of a 5% aqueous solution of sodium dodecylbenzenesulfonate, 100 parts by weight of octamethylcyclotetrasiloxane and 5 parts by weight of particaly hydrolyzed condensate of tetramethoxysilane (product name: Methyl silicate 51, available from Tama Chemicals Co., Ltd.) was stirred for 5 minutes at 7000 rpm by a homomixer to prepare a primary emulsion of polyorganosiloxane. The emulsion was added all at once to a five-neck flask equipped with a stirrer, a reflux condenser, a nitrogen injecting mouth, a monomer adding mouth and a thermometer.

Then, 1 part by weight (solid content) of a 10% aqueous solution of dodecylbenzenesulfonic acid was added and the temperature was raised to 80° C. under nitrogen current while stirring the system. When the temperature reached 80° C., stirring was continued for 6 hours at 80° C. and then the mixture was cooled to 25° C. and left for 20 hours. The mixture was neutralized by sodium hydrogen carbonate and the pH was adjusted to 6.8. The polymerization conversion ratio of cyclic organosiloxane was 87%.

1 g of the emulsion of polyorganosiloxane obtained in this way was placed in an ointment can and heated for 1 hour in an oven of 130° C. The solid content concentration was calculated and the polymerization conversion ratio was calculated therefrom. Evaluation of polymerization conversion ratio and scale amount are shown in Table 9. A large number of scale particles developed on the bottom face, the side face and the stirring blades of the polymerization vessel.

TABLE 9

| | Polymerization conversion ratio of emulsion before reaction with condensation reactive organosilane (I) | Polymerization conversion ratio of emulsion according to the present invention | Scale amount |
|---|---|---|---|
| Ex. 29 | 83 | 90 | Small amount |
| Ex. 30 | 83 | 91 | Small amount |
| Ex. 31 | 83 | 92 | None |
| Ex. 32 | 83 | 89 | Small amount |
| Ex. 33 | 85 | 91 | Small amount |
| Ex. 34 | 85 | 92 | Small amount |
| Ex. 35 | 85 | 92 | None |
| Ex. 36 | 85 | 89 | Small amount |
| Com. Ex. 4 | 87 | — | Large amount |

The above results clearly indicate that according to the present invention, polymerization conversion ratio can be improved and development of scale particles can be inhibited.

Example 37

A five-neck flask equipped with a stirrer, a reflux condenser, a nitrogen injecting mouth, a monomer adding mouth and a thermometer was charged with the emulsion of polyorganosiloxane obtained in Example 30 in an amount of 70 parts by weight (solid content) of polyorganosiloxane particles and 240 parts by weight of deionized water (including water contained in the emulsion of polyorganosiloxane). The temperature was raised to 40° C. under nitrogen current while stirring the system. When the temperature reached 40° C., 0.2 part by weight of sodium formaldehyde sulfoxylate (SFS), 0.01 part by weight of disodium ethylenediaminetetraacetate (EDTA) and 0.0025 part by weight of ferrous sulfate were added. Then, a mixture of 1 part by weight of allyl methacrylate (ALMA) and 0.01 part by weight (solid content) of cumene hydroperoxide was added all at once and stirring was continued for 1 hour at 40° C. Thereafter, a mixture of 30 parts by weight of methyl methacrylate and 0.06 part by weight of cumene hydroperoxide was added by dropping over 1.5 hours. After adding, stirring was continued further for 1 hour to obtain latex of a graft copolymer. The polymerization conversion ratio of the vinyl monomer was 99%.

Subsequently, the latex was diluted with deionized water so that the solid content becomes 15% and then 4 parts by weight (solid content) of a 25% aqueous solution of calcium chloride was added to obtain a coagulated slurry. After heating to 85° C., the coagulated slurry was cooled to 50° C., dehydrated and then dried to obtain powder of polyorganosiloxane graft copolymer. Appearance of the obtained powder was favorable.

INDUSTRIAL APPLICABILITY

According to the present invention, a flame retardant can be obtained, which provides a thermoplastic resin composition excellent in flame retardancy and impact resistance, and by compounding this flame retardant in thermoplastic resin, a flame retardant resin composition excellent in flame retardancy and impact resistance can be obtained.

Also, according to the present invention, in a process for preparing an emulsion of polyorganosiloxane, polymerization conversion ratio can be improved.

The invention claimed is:

1. A graft copolymer containing polyorganosiloxane obtained by polymerizing,
   1 to 8 parts by weight of a vinyl monomer (B) comprising 100 to 20% by weight of a multi-functional monomer containing at least two polymerizable unsaturated bonds in a molecule (b-1) and 0 to 80% by weight of another copolymerizable monomer (b-2) and
   5 to 70 parts by weight of a vinyl monomer (C),
   in the presence of 30 to 95 parts by weight of polyorganosiloxane particles in a latex state (A), so that the total amount of polyorganosiloxane (A), vinyl monomer (B) and vinyl monomer (C) becomes 100 parts by weight,
   wherein the polyorganosiloxane particles in a latex state (A) are prepared by polymerizing siloxane monomers in the presence of a silane grafting agent (E), thereby producing a modified polyorgansiloxane, and said modified polyorganosiloxane is subsequently reacted with a silane grafting agent (F) such that grafting agent (F) is unevenly distributed on the surface of the polyorgansiloxane particles.

2. The graft copolymer containing polyorganosiloxane of claim 1, wherein polyorganosiloxane (A) is obtained by seed polymerizing organosiloxane using a seed polymer that is swelled by organosiloxane.

3. The graft copolymer containing polyorganosiloxane of claim 2, wherein the particle size of said seed polymer is 0.001 to 0.03 μm.

4. The graft copolymer containing polyorganosiloxane of claim 2, wherein Tg of said seed polymer is at most 0° C.

5. The graft copolymer containing polyorganosiloxane of claim 2, wherein the proportion of said seed polymer to polyorganosiloxane (A) is 0.1 to 10% by weight.

6. The graft copolymer containing polyorganosiloxane of claim 2, wherein the swelling volume ratio of said seed polymer is 3 to 50 times.

7. The graft copolymer containing polyorganosiloxane of claim 2, wherein the swelling volume ratio of said seed polymer is 5 to 25 times.

8. The graft copolymer containing polyorganosiloxane of claim 1, wherein vinyl monomer (C) is at least one monomer selected from the group consisting of an aromatic vinyl monomer, a cyanized vinyl monomer, a (meth)acrylic ester monomer and a vinyl monomer containing a carboxyl group.

9. The graft copolymer containing polyorganosiloxane of claim 1, wherein a radical polymerization initiator (D) having solubility to water of 0.5 to 10 g/100 g (20° C.) and hydrogen drawing properties of 10 to 30% is used when polymerizing vinyl monomer (B) and/or vinyl monomer (C).

10. The graft copolymer containing polyorganosiloxane of claim 1, wherein the amount of grafting agent (E) is 0.1 to 10 parts by weight based on 100 parts by weight of polyorganosiloxane (A).

11. The graft copolymer containing polyorganosiloxane of claim 1, wherein the reaction temperature of grafting agent (F) and vinyl monomer (B) is 20 to 60° C.

12. A flame retardant comprising the graft copolymer containing polyorganosiloxane of claim 1.

13. A resin composition comprising 0.1 to 20 parts by weight of the flame retardant of claim 12 based on 100 parts by weight of thermoplastic resin.

* * * * *